United States Patent [19]
Kim et al.

[11] Patent Number: 5,907,379
[45] Date of Patent: May 25, 1999

[54] IN-PLANE SWITCHING LIQUID CRYSTAL DISPLAY HAVING HIGH APERTURE RATIO

[75] Inventors: Dong-Kyu Kim; Woon-Yong Park, both of Kyungki-do, Rep. of Korea

[73] Assignee: Samsung Electronics Co., Ltd., Suwon, Rep. of Korea

[21] Appl. No.: 08/955,852

[22] Filed: Oct. 21, 1997

[30] Foreign Application Priority Data

Oct. 21, 1996 [KR] Rep. of Korea ............. 96-47508
Oct. 21, 1997 [KR] Rep. of Korea ............. 97-53939

[51] Int. Cl.$^6$ ................................. G02F 1/1343
[52] U.S. Cl. ................... 349/141; 349/139; 349/147; 349/110
[58] Field of Search .................. 349/141, 139, 349/147, 110

[56] References Cited

U.S. PATENT DOCUMENTS

5,107,355  4/1992  Satoh et al. ..................... 359/87
5,731,856  3/1998  Kim et al. ........................ 349/43
5,745,207  4/1998  Asada et al. .................... 349/141

*Primary Examiner*—William L. Sikes
*Assistant Examiner*—Robert J. Hollingshead
*Attorney, Agent, or Firm*—Myers Bigel Sibley & Sajovec

[57] ABSTRACT

A pair of common electrode lines are formed in the transverse direction, and a plurality of common electrodes in the longitudinal direction connect the common electrodes. Each pixel electrode parallel to the common electrodes is arranged between two of the common electrodes. A pair of connecting members which are connected to the pixel electrodes cover the edges of the common electrode lines adjacent the aperture region. Accordingly, since it is not necessary for a black matrix pattern formed in another substrate to shield the region where the liquid crystal direction does not properly behave, the black matrix lies outside the regions surrounded by the common electrodes, the pixel electrodes and the common electrode lines. In addition, the data line overlaps the adjacent common electrode, and thereby the aperture ratio is increased.

31 Claims, 8 Drawing Sheets

IN-PLANE SWITCHING LIQUID CRYSTAL DISPLAY HAVING HIGH APERTURE RATIO

BACKGROUND OF THE INVENTION (a) Field of the Invention

The present invention relates to a liquid crystal display (hereinafter referred to as an LCD). In particular, to an in-plane switching (hereinafter referred to as IPS) LCD.

(b) Description of the Related Art

A liquid crystal display in twisted-nematic (TN) mode is a commonly used LCD. The TN mode LCD includes a first substrate having a plurality of pixel electrodes and a second substrate having a common electrode, and a liquid crystal material therebetween. The direction of the liquid crystal molecules is twisted from one substrate to the other substrate, and the electric field between the two substrates due to the applied voltage causes the variation of the direction.

However, the TN mode LCD has a narrow viewing angle which depends on the viewing direction. In order to obtain a wide viewing angle, in-plane switching LCDs are suggested.

In the IPS LCD, a plurality of pixel electrodes and a plurality of common electrodes are formed in one substrate. In the other substrates, color filters and a black matrix are formed, and the black matrix serves as a light shield of the region where the liquid crystal direction cannot be controlled by the ordinary electric field. An example of an IPS LCD is disclosed in European Patent Application No. 93307154.0.

A conventional IPS LCD is described with reference to FIGS. 1–3.

Figure 1:
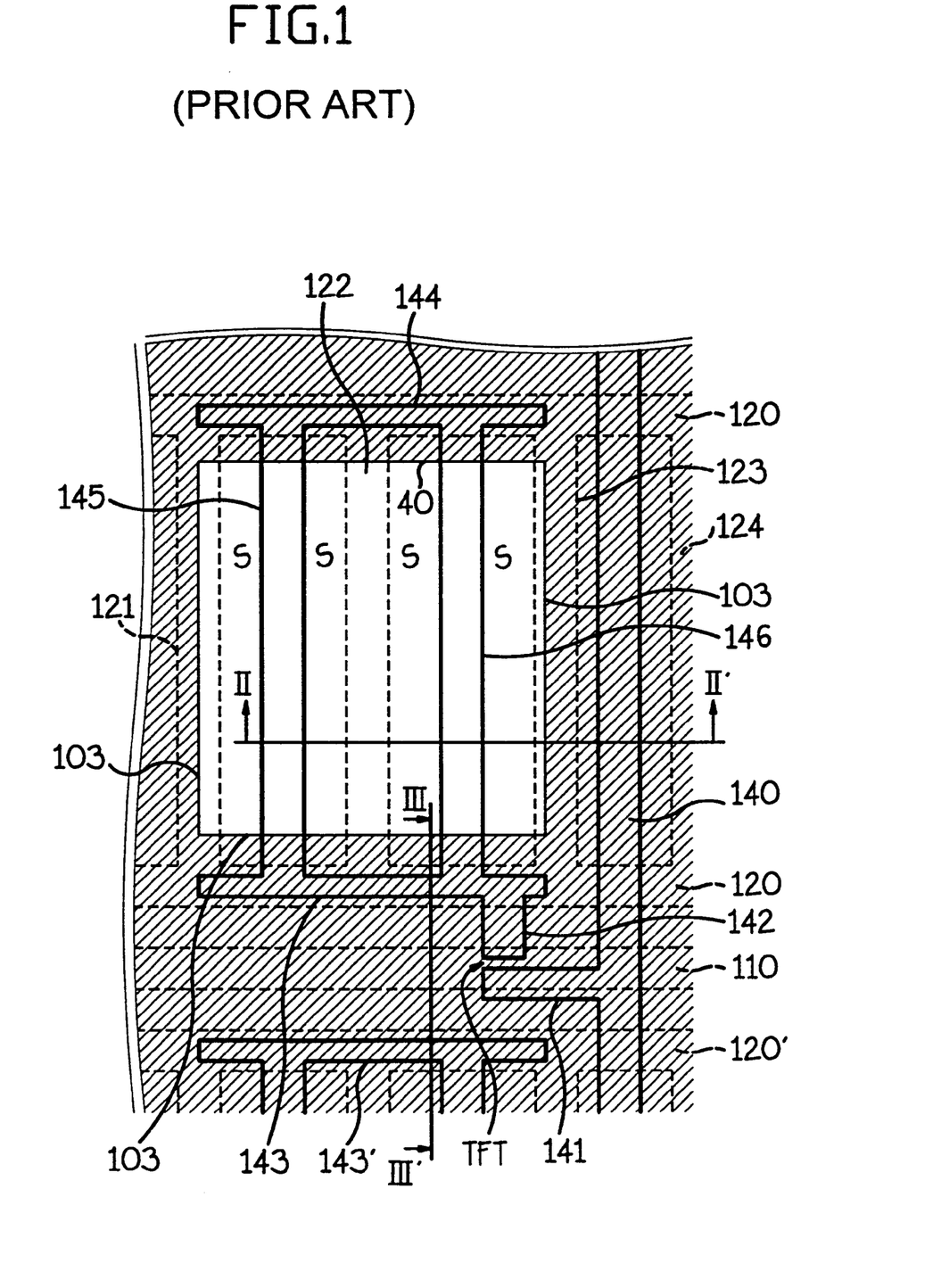
FIG. 1 shows a layout view of a conventional IPS LCD.
Figure 2:
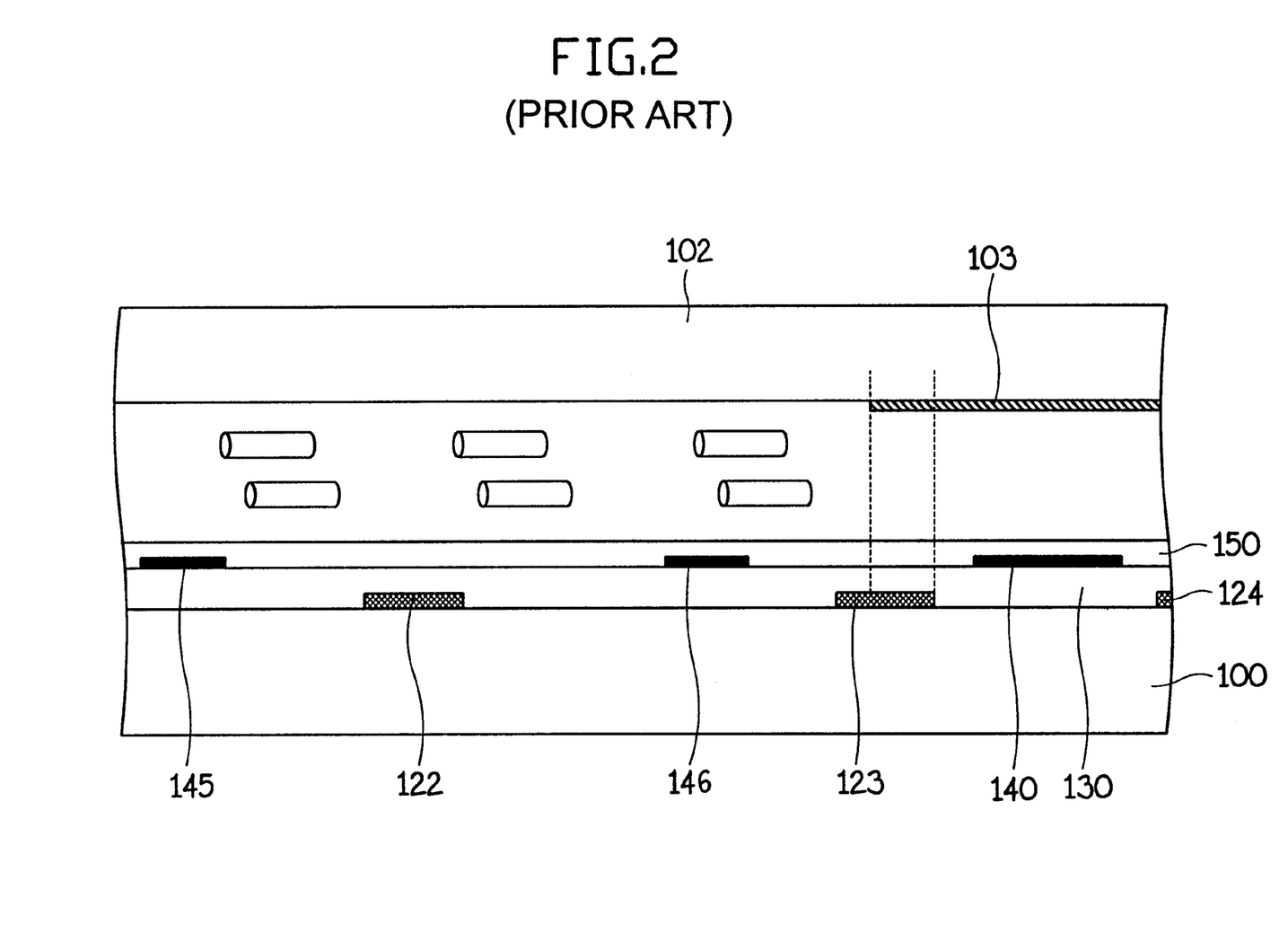
FIGS. 2 and 3 show sectional views cut along the line II–II' and III–III'.
Figure 3:
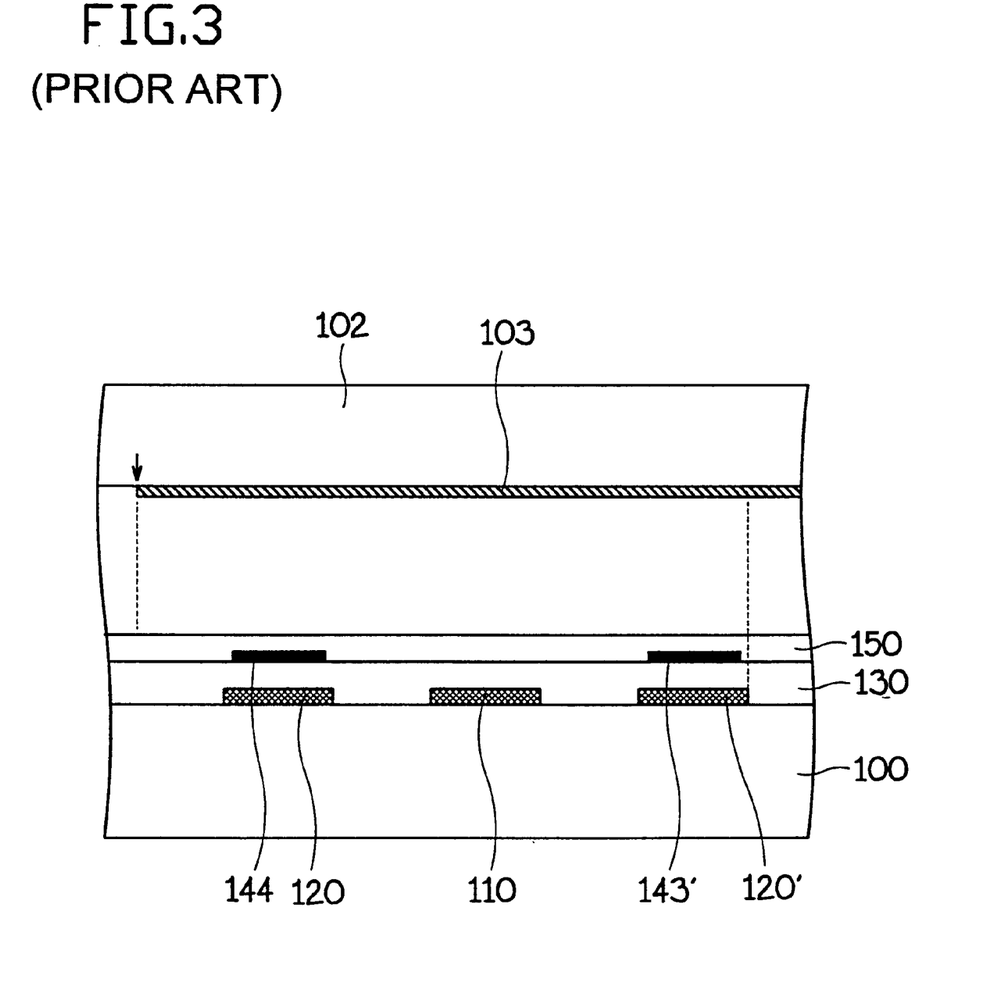

FIG. 1 is a layout view of a conventional IPS LCD, and its sectional views cut along the lines II–II' and III–III' are shown in FIGS. 2 and 3, respectively. FIG. 1 includes a layout of electrodes and wiring of a first substrate as well as of a black matrix of a second substrate.

First, the first substrate having the electrodes and the wiring are described with reference to FIGS. 1–3. Here, a pixel region is the region surrounded by two adjacent gate lines and two adjacent data lines.

A gate line 110 and a pair of common electrode lines 120 is formed in the transverse direction on a transparent insulating substrate 100. Three common electrodes 121, 122 and 123 aligned in the longitudinal direction in a pixel are formed in the substrate 100, and they are connected to the common electrode lines 120. The reference numeral 124 represents a common electrode in the adjacent pixel.

The gate line 110, the common electrode lines 120 and the common electrodes 121, 122 and 123 are covered with a gate insulting layer 130. A data line 140 and a pixel electrode pattern 143, 144, 145 and 146 are formed on the gate insulating layer 130. The data line 140 extends in the longitudinal direction, and there exists a gap between the data line 140 and the adjacent common electrodes 123 and 124. Two pixel electrodes 145 and 146 of the pixel electrode pattern are parallel to the common electrodes 121, 122 and 123, and each pixel electrode 145 or 146 is arranged between the two of the common electrodes 121, 122 and 123. A pair of connecting members 144 and 143 of the pixel electrode pattern are parallel to the common electrode lines 120 and connected to the pixel electrodes 145 and 146, and the connecting members 143 and 144 overlap the common electrode lines 120, thereby forming storage capacitors. Each connecting member 143 or 144 has a width smaller than those of the common electrode lines 120, and thus one border line of each common electrode line 120 towards the common electrodes 121, 122 and 123 is exposed.

When considering the first substrate only, that is, not considering the second substrate, the effective display area is the total area of the aperture regions S surrounded by the common electrodes 121, 122 and 123, the common electrode lines 120, and the pixel electrodes 145 and 146.

Next, the black matrix pattern of the second substrate is described with reference to FIGS. 1–3.

A black matrix pattern 103 is arranged such that it completely shields the common electrode lines 120, the connecting members 143 and 144, the gate line 110 and the data line 140. The longitudinal portion of the black matrix 103 fully shields the data line 140, and partially shields the common electrodes 121 and 123 adjacent to the data line 140, considering the process margin during assembling the two substrates. The transverse portion of the black matrix 103 fully shields the gate line 110 and the common electrode line 120, and partially shields portions of the common electrodes 121, 122 and 123 and the pixel electrodes 145 and 146 near the common electrode lines 120. It is because, considering process margin during assembling the two substrates, the black matrix 103 should shield the disturbed area where the liquid crystal direction is disturbed due to the vertical electric field between the exposed portion of the common electrode line 120 and the pixel electrode pattern 143, 144, 145 and 146.

As a result, the black matrix pattern 103 intrudes the regions S and thus the net effective display area becomes smaller than the total area of the regions S Accordingly, the conventional IPS LCD has a small aperture ratio, since all electrodes are arranged in one substrate and the width of the black matrix is large.

Furthermore, the black matrix 103 of the conventional IPS LCD is often grounded to discharge electrostatic charges. In this case, the potential difference between the black matrix 103 of the second substrate and the electrodes of the first substrate disturbs the liquid crystal direction, thereby causing the light leakage.

The end portions of the gate line 110 and the data line 140 are exposed and form pads for receiving the external signal. Since aluminum used for the gate line and tantalum used for the data line is apt to be oxidized when exposed to air, the ohmic contact of the pad may be easily deteriorated. In order to solve this problem, a layer made of materials which are not easily oxidized such as ITO (indium tin oxide) may be formed on the pads. However, since an additional mask for forming the layers is necessary, the product cost may increase.

SUMMARY OF THE INVENTION

An object of the present invention is to increase the aperture ratio of the IPS LCD.

Another object of the present invention is to prevent the liquid crystal direction from being disturbed due to the grounded black matrix.

Another object of the present invention is to reduce the defect of the pads without increase of the cost.

In order to achieve these objects, a connecting member connected to a pixel electrode covers at least one edge of a common electrode line adjacent common electrodes. Then, the electric field due to the common electrode line and the connecting member is shielded by the connecting member, and thus it is not necessary for a black matrix pattern to shield the common electrode line.

It is preferably that the width of the connecting member is larger than that of the common electrode line, and that the common electrode line is made of a material having low resistivity such as aluminum.

According to another feature of the present invention, a data line overlaps the adjacent common electrodes. Then, the length of the transverse side of the aperture region is increased.

In the above-described two structures, the black matrix may cover only a gate line and the data line. It is preferably that the black matrix overlaps only a portion of the common electrode line and a portion of the common electrode line adjacent to the data line.

Here, the border lines of the common electrode overlapping the black matrix are preferably separated from the border lines of the black matrix by at least the allowable alignment deviation. The allowable alignment deviation means the allowable length due to misalignment in the process for assembling two substrates.

In addition, it is preferably that the width of the connecting member is twice the allowable alignment deviation, and that the width of the portion of the connecting member overlapping the black matrix is half of the width of the connecting member.

Since the black matrix is arrange outside the aperture regions, even though the black matrix is grounded, the disturbance of the liquid crystal direction appears outside of the aperture regions.

In addition, the gate line and/or the data line includes a bottom metal layer and a top ITO layer to improve the ohmic contact of the pad and to prevent the defect of the pad.

DETAILED DESCRIPTION OF THE PREFERRED EMBODIMENTS

The embodiments of the present invention will be described with reference to FIGS. 4–6.

Figure 4:
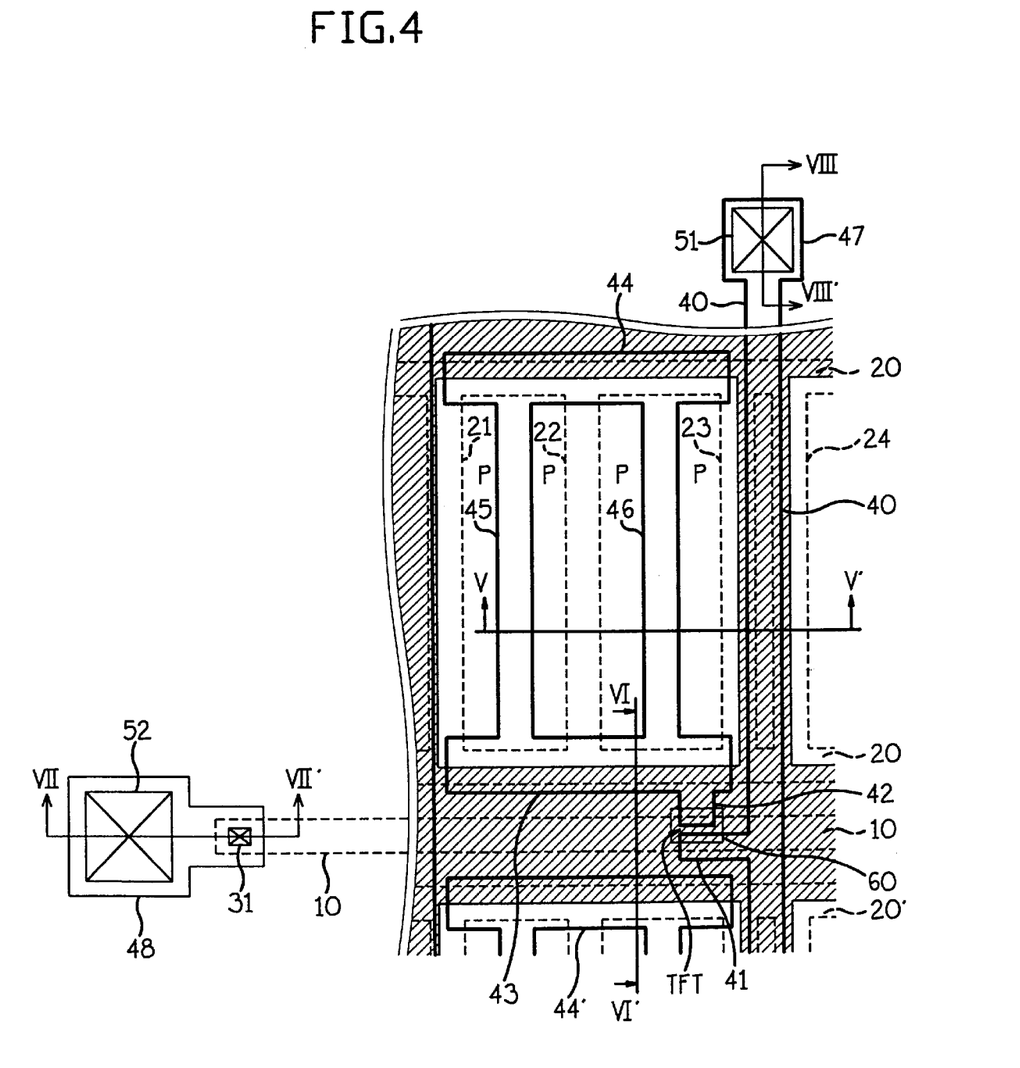
FIG. 4 shows a layout view of an IPS LCD according to an embodiment of the present invention.
Figure 5:
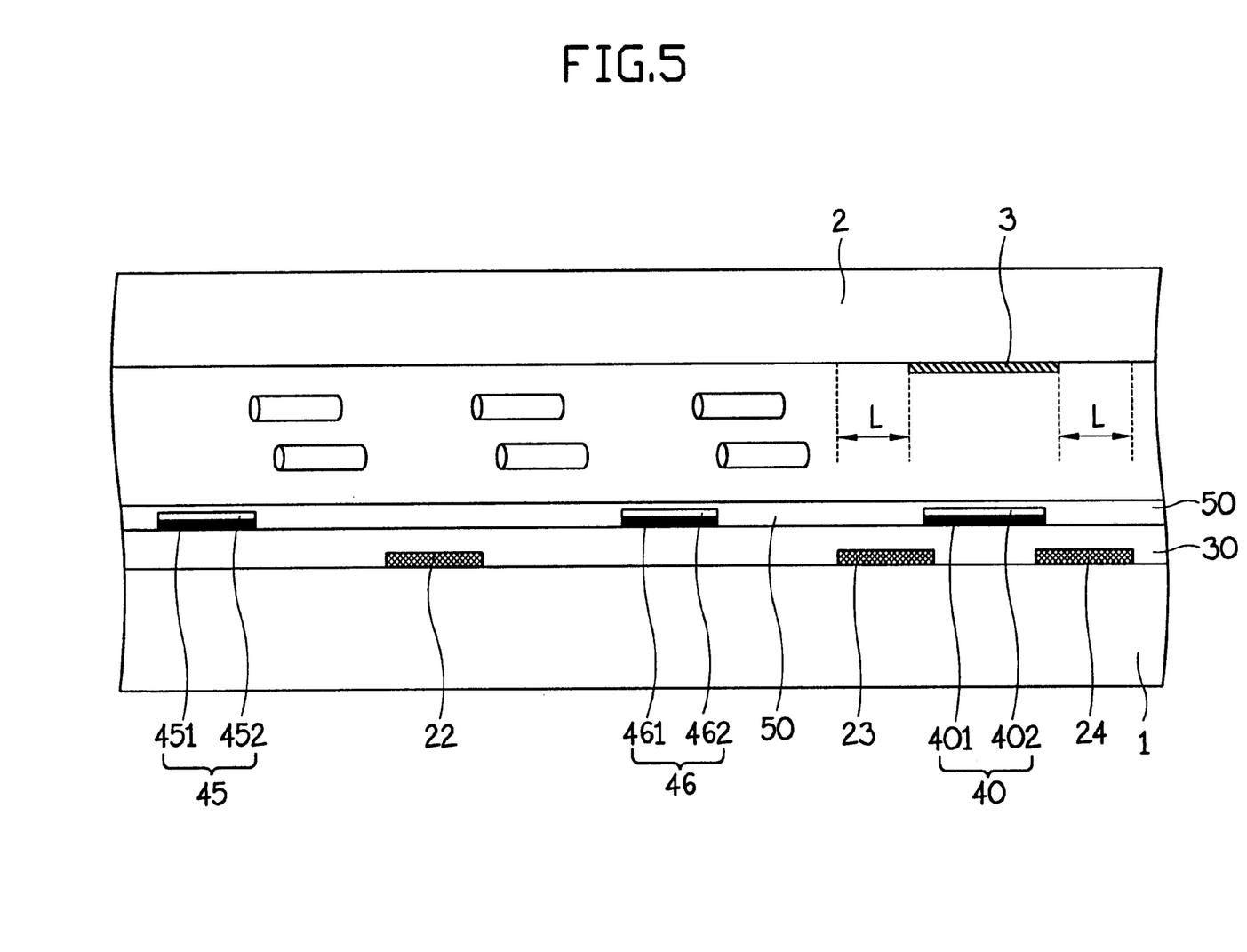
FIGS. 5, 6, 7 and 8 show sectional views cut along the lines V–V', VI–VI', VII–VII' and VIII–VIII', respectively.
Figure 6:
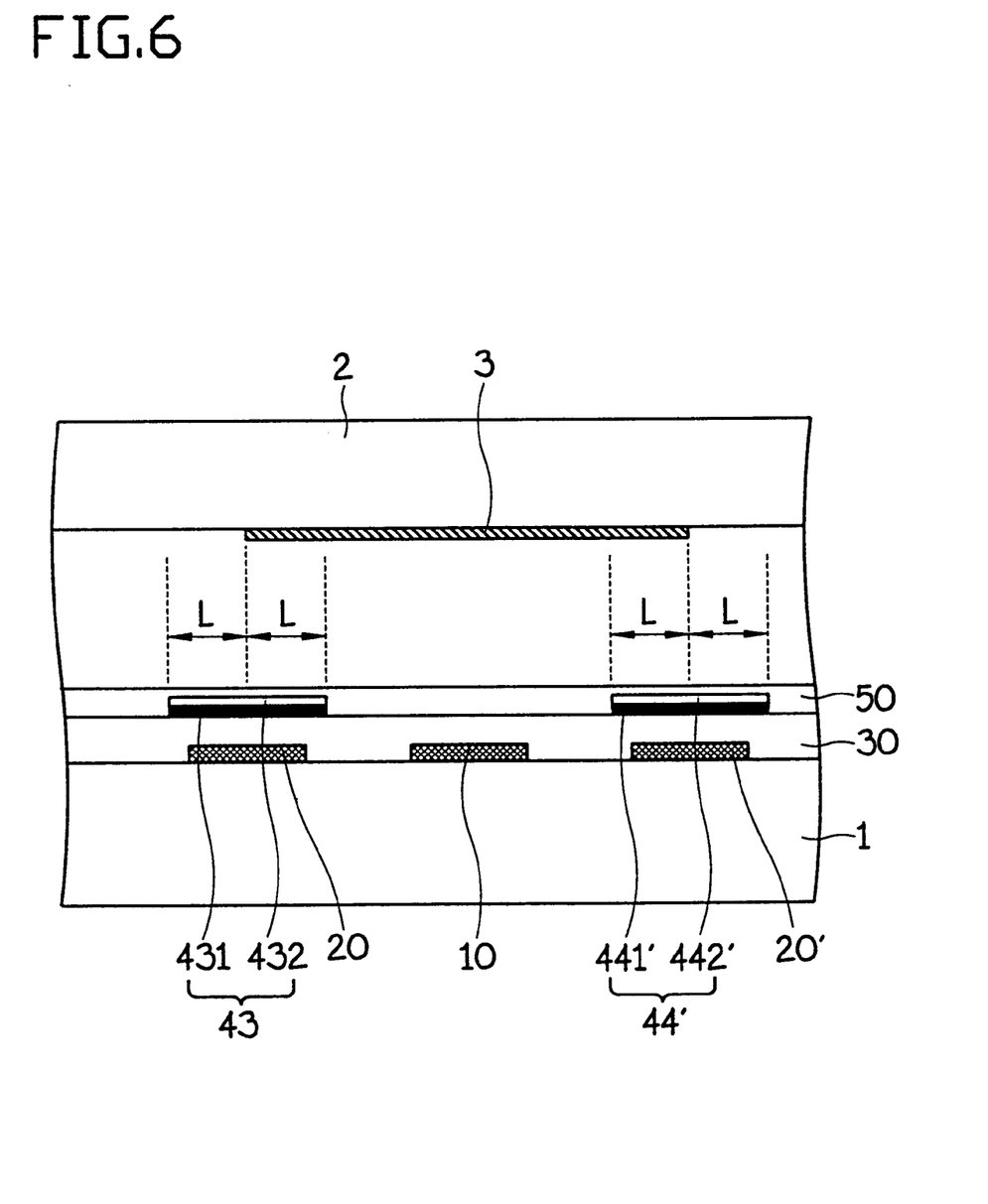
Figure 7:
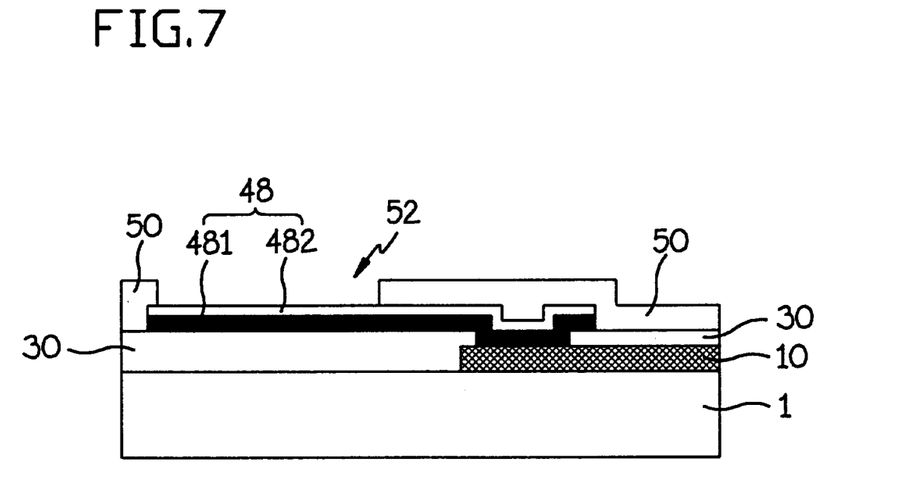
Figure 8:
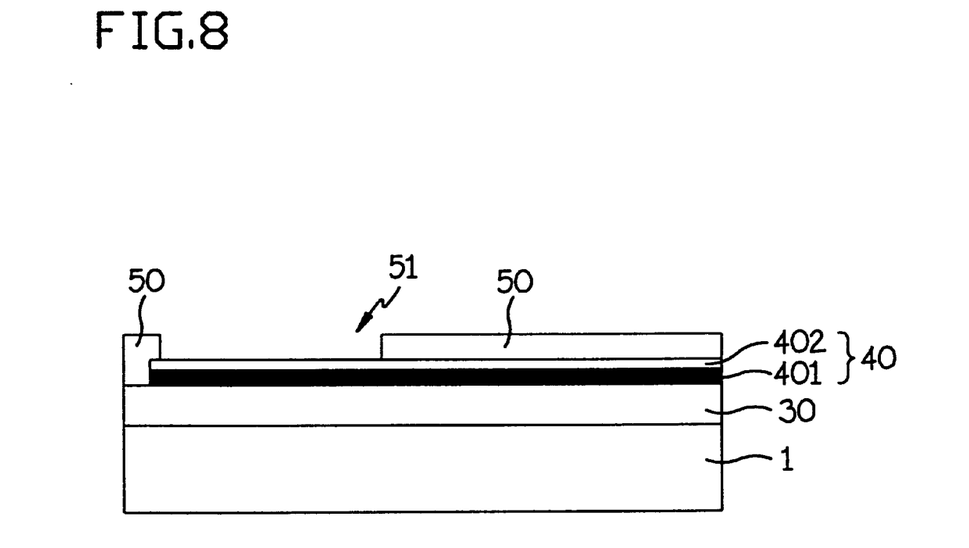

FIG. 4 is a layout view of an IPS LCD according the embodiment of the present invention, and its sectional views cut along the lines V–V' and VI–VI' VII–VII' and VIII–VIII' are shown in FIGS. 5, 6, 7 and 8, respectively. FIG. 4 includes a layout of electrodes and wiring of a first substrate as well as of black matrix of a second substrate, FIG. 7 shows a gate pad and FIG. 8 shows a data pad.

First, the first substrate having the electrodes and the wiring are described with reference to FIGS. 4–8.

A gate line 10 is formed in the transverse direction on a transparent insulating substrate 1, and extends to a pad portion. A pair of common electrode lines 20 parallel to the gate line 10 are formed on the substrate 1, and common electrodes 21, 22, 23 and 24 formed in the longitudinal direction on the substrate 1 to connect the pair of the common electrode lines 20. Even though three common electrodes 21, 22 and 23 are formed in a pixel in FIG. 4, the number of the common electrodes in a pixel is not limited to this number. The gate line 10, the common electrode line 20 and the common electrodes 21, 22, 23 and 24 are made of aluminum (Al), chromium (Cr) or molybdenum (Mo) and have thickness of 300–400 nm. Since Al has relatively low resistivity and thus the Al wiring or Al electrode can have small width, Al is desirable in view of the aperture ratio.

The gate line 10, the common electrode lines 20 (and 20') and the common electrodes 21, 22, 23 and 24 are covered with a gate insulating layer 30. The gate insulating layer 30 has a thickness of below 300 nm and is made of silicon nitride (SiNx), and a contact hole 31 exposing the end portion of the gate line 10 is formed in the gate insulating layer 30.

A data pattern including a data line 40, a gate pad 48 and a pixel electrode pattern 43, 44 (44'), 45 and 46 is formed on the gate insulating layer 30, and the data pattern has a double-layered structure including a bottom metal layer an a top ITO layer. The metal layer is made of Cr or Mo and has the thickness of 150–400 nm. The ITO layer prevents oxidation of the metal layer in the pad portions.

The data line 40 including a bottom metal layer 401 and a top ITO layer 402 extends in the longitudinal direction, and expands to form a data pad 47 at its end portion. The data pad 47 is connected to external circuits for receiving and transmitting signals from the external circuits. The data line 40 overlaps the adjacent common electrodes 23 and 24 in order to increase the aperture ratio. It is preferably that the overlapping area of the data line 40 and its adjacent common electrodes 23 and 24 is minimized in order to reduce the coupling capacitance between them.

Two pixel electrodes 45 and 46 of the pixel electrode pattern are parallel to the common electrodes 21, 22 and 23, and each pixel electrode 45 or 46 lies between two of the common electrodes 21, 22 and 23. The pixel electrodes 45 and 46 are connected to a pair of connecting members 43 and 44 which are parallel to the common electrode lines 20. The connecting members 43 and 44 overlap the common electrode lines 20, thereby forming storage capacitors. Each connecting member 43 or 44 shields the respective common electrode line 20, in particular, covers the first edge of the common electrode line 20 adjacent the common electrodes 21, 22 and 23, thereby shielding the electric field due to potential difference between the common electrode line 20 and the connecting members 43 and 44. In addition, each connecting member 43 or 44 has a width larger than the common electrode lines 20, thereby increasing the storage capacitance. The width of the connecting member 43 is preferably twice the allowable alignment deviation L, as shown in FIG. 6. Here, the pixel electrode pattern 43, 44' (44), 45 and 46 has also a double-layered structure including a bottom metal layer 431, 441', 451 and 461 and a top ITO layer 432, 442', 452 and 462.

A gate pad 48 transmitting external scanning signals to the gate line 10 is formed on the gate insulating layer near the contact hole 31, and the gate pad 48 is connected to the gate line 10 through the contact hole 31. The gate pad 48 also includes a bottom metal layer 481 and a top ITO layer 482.

A semiconductor layer such as a polysilicon layer or an amorphous silicon layer 60 having a thickness below 200 nm is formed on the portion of the gate insulating layer 20 on the gate line 10, and a doped amorphous silicon layer (which is formed between the elements represented by the reference numerals 60 and 41 and 42 in FIG. 4) having a thickness below 50 nm is formed on the amorphous silicon layer 60. A source electrode 41 which is a branch of the data line 40, and a drain electrode 42 which is connected to the connecting member 43 and opposite the source electrode 41 with respect to the gate line 10 are formed on the doped amorphous silicon layer. The doped amorphous silicon layer is necessary for improving the ohmic contact between the amorphous silicon layer 60 and the source and the drain electrodes 41 and 42. The source and the drain electrode 41 and 42 along with the amorphous silicon layer 60 and a gate electrode which is a portion of the gate line 10 under the amorphous silicon layer 60 form a thin film transistor. Accordingly, the image signals from the data line 40 flow into the pixel electrodes 45 and 46 through the thin film transistor which is turned on or off responsive to the scanning signals from the gate line 10.

A passivation layer 50 made of silicon nitride is formed on the data line 40, the gate pad, the pixel electrode pattern 43, 44, 45 and 46 are exposed portions of the amorphous silicon layer 60, and the passivation layer 50 has contact holes 51 and 52 exposing the data pad 47 and the gate pad 48.

Next, the black matrix pattern of the second substrate is described with reference to FIGS. 4–6.

A black matrix pattern 3 made of Cr is arranged such that it completely shields the gate line 10 and the data line 40. The transverse portion of the black matrix 3 fully shields the gate line 10, and partially shields the common electrode line 20. In addition, it is preferably that the border line of the transverse portion of the black matrix 3 lies at the center of the common electrode line 20, as shown in FIG. 6. The longitudinal portion of the black matrix 3 completely shields the data line 40 and partially shields the common electrodes 23 and 24 adjacent to the data line 40, considering the process margin during assembling the two substrates. Furthermore, the border lines of the longitudinal portion of the black matrix 3 lies inside of the border lines of the common electrodes 23 and 24 opposite the data line 40 by the length equal to or more than the allowable alignment deviation L, as shown in FIG. 5.

The black matrix 3 may be grounded for protecting the electrostatic discharge through the first substrate.

As a result, the net effective display area becomes the total area of the aperture regions P enclosed by the common electrodes 21, 22 and 23, the connecting members 43 and 44 and the pixel electrodes 45 and 46, and the black matrix does not affect the effective display area.

The effective display area in the IPS LCD according to this embodiment is described with compared to the conventional IPS LCD in FIG. 1, when the pixel size and the widths of the wirings are fixed.

Considering the longitudinal length of the display area, the longitudinal length is the distance between the border lines of the two adjacent transverse portions of the black matrix 103 in FIG. 1. The distance of the border lines between the common electrode line 20 and the adjacent transverse portion of the black matrix 103 is determined by the allowable alignment deviation and the width of the region where the direction of the liquid crystal does not properly behave due to the distorted electric fields. Therefore, the distance may be larger than a specified value. In the embodiment of the present invention, the longitudinal length is the distance between the inner border lines of the two adjacent connecting members 43 and 44 connected to each other as shown in FIG. 4. Since the connecting member 43 and 44 only covers the inner border line of the common electrode line 20, the distance between the inner border line of the connecting member 43 or 44 and that of the common electrode line 20 may be equal to or larger than zero. Accordingly, the longitudinal length of the display area according to the present invention is larger than that of the conventional art.

Next, considering the transverse length of the display area, there is a gap between the data line 40 and the common electrode lines 23 and 24 adjacent to the data line 40 in the conventional art shown in FIG. 1. However, the common electrodes 23 and 24 overlap the data line 40 according to the embodiment of the present invention shown in FIG. 4. Accordingly, the transverse length of the display area according to the present invention is larger than that of the conventional art.

As a result, the display area according to the present invention is larger than that of the conventional art.

In addition, since the black matrix 3 is outside of the aperture region, even though the black matrix 3 is grounded, the liquid crystal direction in the aperture region may be not affected by the electric field due to the black matrix 3.

Finally, an embodiment which modifies the structures of the gate line, the gate pad, the common electrodes and the common electrode lines is described with reference to FIGS. 9 and 10.

Figure 9:
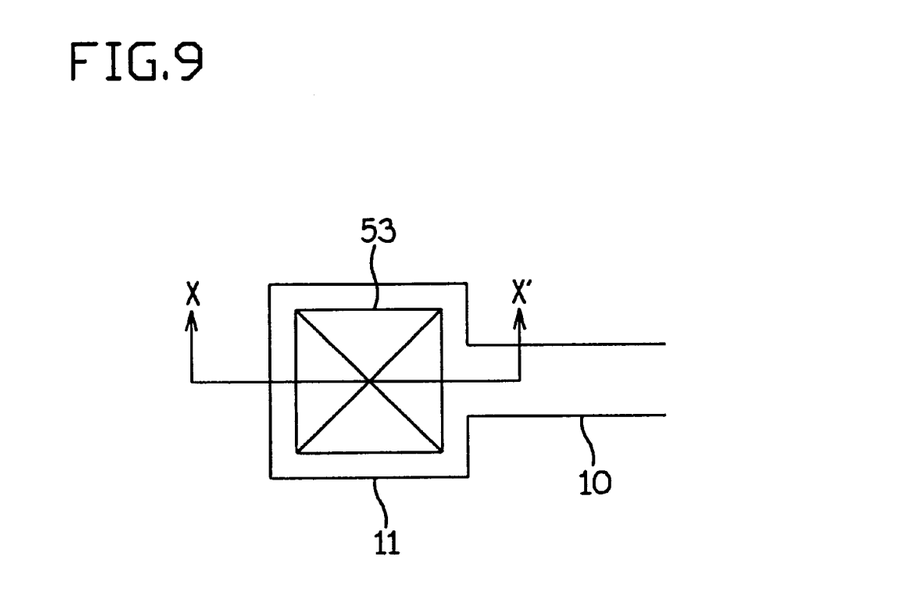
FIG. 9 is a layout view of a pad in an IPS LCD according to another embodiment of the present invention.
Figure 10:
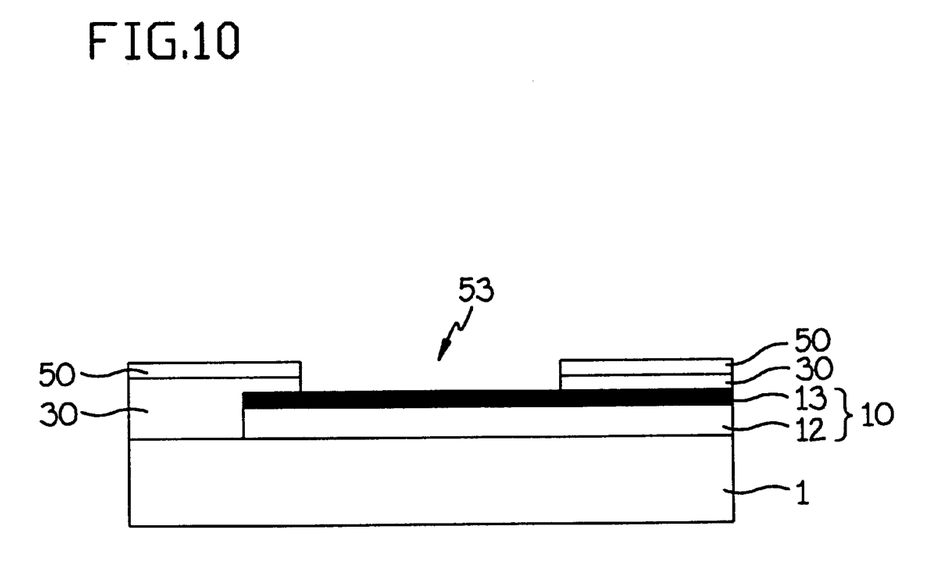
FIG. 10 show sectional views cut along the line X–X'

FIG. 9 shows a gate pad of the LCD according to the embodiment of the present invention, and FIG. 10 is a sectional view cut along the line X–X' in FIG. 9.

In this embodiment, a gate pad 11 is an end portion of the gate line 10. In addition, the gate line 10, the gate pad 11, the common electrode lines 20 and the common electrodes 21, 22 and 23 have double layered structures of a bottom metal layer and a top ITO layer in order to prevent defect of the gate pad 11. For example, as shown in FIGS. 9 and 10, a gate line 10 is made of a bottom metal layer 12 and a top ITO layer 13, and extends to form a gate pad 11. The central portion of the gate pad 11 is exposed by a contact hole 53 formed in a gate insulating layer 30 and a passivation layer 50 which covers the remaining portions of the gate pad 11. Since the common electrode lines 20 and the common electrodes 21, 22 and 23 are simultaneously formed with the gate line 10 and the gate pad 11, they also have a double-layered structure.

A data line and a data pad may have single-layered structure in this embodiment.

What is claimed is:

1. An in-plane switching liquid crystal display comprising:
    a plurality of common electrodes formed in a direction;
    a common electrode line connecting the common electrodes, the common electrode line including a first edge adjacent the common electrodes and a second edge opposite the common electrodes;
    a plurality of pixel electrodes, each formed between two of the common electrodes in the same direction as the common electrodes; and
    a connecting member overlapping the common electrode line, connected to the pixel electrode and covering at least a portion of the first edge of the common electrode line.

2. The liquid crystal display according to claim 1, further comprising:
    a gate line parallel to the common electrode line,
    a data line parallel to the plurality of pixel electrode; and
    a three-terminal switching element having a gate connected to the gate line, a source connected to the data line and a drain connected to the connecting member.

3. The liquid crystal display according to claim 2, wherein width of the connecting member is larger than width of the common electrode line.

4. The liquid crystal display according to claim 2, wherein the common electrode line is made of aluminum.

5. The liquid crystal display according to claim 2, wherein the data line is overlapped with the common electrodes adjacent to the data line and insulated from the common electrodes.

6. The liquid crystal display according to claim 2, wherein the gate line has a double-layered structure comprising a bottom metal layer and a top indium tin oxide layer, and extends to form a gate pad.

7. The liquid crystal display according to claim 2, wherein the data line has a double-layered structure comprising a bottom metal layer and a top indium tin oxide layer, and extends to form a data pad.

8. The liquid crystal display according to claim 2, further comprising a gate pad having a double-layered structure which includes a bottom metal layer and a top indium tin oxide layer, and wherein the data line has a double-layered structure comprising a bottom metal layer and a top indium tin oxide layer, and extends to form a data pad.

9. A panel of a liquid crystal display, comprising:
a gate line formed in a first direction;
a plurality of common electrodes, electrically connected to each other, formed in a second direction;
a pixel electrode arranged between two of the common electrodes;
a data line which is formed in the second direction, overlaps the adjacent common electrodes and is insulated from the common electrodes; and
a switching element having a gate connected to the gate line, a source connected to the data line and a drain electrically connected to the pixel electrode.

10. The panel according to claim 9, further comprising:
a common electrode line which is formed in the first direction and is connected to the common electrodes; and
a connecting member which is formed in the first direction and is connected to the pixel electrode.

11. The panel according to claim 9, wherein the common electrodes are made of aluminum.

12. The panel according to claim 9, wherein the gate line has a double-layered structure comprising a bottom metal layer and a top indium tin oxide layer, and extends to form a gate pad.

13. The panel according to claim 9, wherein the data line has a double-layered structure comprising a bottom metal layer and a top indium tin oxide layer, and extends to form a data pad.

14. The panel according to claim 9, further comprising a gate pad having a double-layered structure which includes a bottom metal layer and a top indium tin oxide layer, and wherein the data line has a double-layered structure comprising a bottom metal layer and a top indium tin oxide layer, and extends to form a data pad.

15. A panel of a liquid crystal display, comprising:
a transparent insulating substrate;
a gate line which is formed on the substrate, has a double-layered structure comprising a bottom metal layer and a top indium tin oxide layer, and extends to form a gate pad;
a plurality of common electrodes which are formed on the substrate, connected to each other and separated from the gate line;
an insulating layer covering the gate line and the common electrodes;
a plurality of pixel electrodes which are formed on the insulating layer and are arranged between two of the common electrodes;
a data line which is formed on the insulating layer and extends to form a data pad; and
a switching element having a gate connected to the gate line, a source connected to the data line and a drain connected to the pixel electrode.

16. The panel according to claim 15, wherein the data line has a double-layered structure comprising a bottom metal layer and a top indium tin oxide layer.

17. A panel of a liquid crystal display, comprising:
a transparent insulating substrate;
a gate line which is formed on the substrate;
a plurality of common electrodes which are formed on the substrate, connected to each other and separated from the gate line;
an insulating layer covering the gate line and the common electrodes;
a plurality of pixel electrode which are formed on the insulating layer and are arranged between two of the common electrodes;
a data line which is formed on the insulating layer, has a double-layered structure comprising a bottom metal layer and a top indium tin oxide layer, and extends to form a data pad; and
a switching element having a gate connected to the gate line, a source connected to the data line and a drain connected to the pixel electrode.

18. The panel according to claim 17, further comprising a gate pad which is formed on the insulating layer, connected to the gate line through a contact hole formed in the insulating layer, and has a double-layered structure including a bottom metal layer and a top indium tin oxide layer.

19. A liquid crystal display, comprising:
a first substrate including
a gate line in a first direction,
a common electrode line in the first direction separated from the gate line,
a plurality of common electrodes in a second direction which are parallel to each other and connected to the common electrode line at at least a portion of a first edge of the common electrode line,
a plurality of pixel electrodes in the second direction which are separated from the gate line, the common electrode line and the common electrodes and arranged between two of the common electrodes,
a connecting member in the first direction which is connected to the pixel electrodes and separated from the gate line, the common electrode line and the common electrodes, and shields the first edge of the common electrode line,
a data line in the second direction separated from the gate line, the common electrode line, the common electrodes, the pixel electrode and the connecting member; and
a second substrate which is opposite the first substrate and includes a black matrix shielding the gate line and the data line.

20. The liquid crystal display according to claim 19, wherein the black matrix partially shields the common electrode line.

21. The liquid crystal display according to claim 20, wherein the black matrix partially shields a first edge of the common electrode adjacent to the data line.

22. The liquid crystal display according to claim 21, wherein distance between a second edge of the common electrode not being shielded by the black matrix and an edge of the black matrix is at least twice as large as an allowable alignment deviation.

23. The liquid crystal display according to claim 20, wherein the black matrix is grounded.

24. The liquid crystal display according to claim 20, wherein the width of the connecting member is larger than the width of the common electrode line.

25. The liquid crystal display according to claim 24, wherein the width of the connecting member is twice the allowable alignment deviation.

26. The liquid crystal display according to claim 25, wherein the width of a portion of the connecting member shielded by the black matrix is half of the width of the connecting member.

27. The liquid crystal display according to claim 20, wherein the common electrode line is made of aluminum.

28. The liquid crystal display according to claim 20, wherein the data line overlaps the adjacent common electrode.

29. The liquid crystal display according to claim 2, wherein the common electrode line is a first common electrode line, the liquid crystal display further comprising:

a second common electrode line which is located opposite the first common electrode line with respect to the common electrodes, is connected to the common electrodes, and includes a first edge adjacent the common electrodes and a second edge opposite the common electrodes; and a second connecting member which is located opposite the first connecting member with respect to the pixel electrodes, is connected to the pixel electrodes, overlaps the second common electrode line, and covers at least a portion of the first edge of the second common electrode line.

30. The liquid crystal display according to claim 29, wherein the first and second connecting members completely cover the first and second common electrode lines.

31. The liquid crystal display according to claim 29, wherein the data line overlaps the common electrodes adjacent the data line and is insulated from the common electrodes.

* * * * *